United States Patent Office 3,851,051
Patented Nov. 26, 1974

3,851,051
SOFT GELATIN CAPSULE CONTAINING HIGH WATER CONTENT FILL
John J. Miskel, Bloomfield Hills, Warren W. Kindt, East Detroit, and Edward C. Connor, Warren, Mich., assignors to R. P. Scherer Corporation
No Drawing. Filed July 17, 1970, Ser. No. 55,993
Int. Cl. A61j 3/07; A61k 9/04
U.S. Cl. 424—37    5 Claims

ABSTRACT OF THE DISCLOSURE

Soft gelatin capsules and the method of their preparation containing aqueous solutions, aqueous colloid suspensions, aqueous macrocrystalline and microcrystalline suspensions of active chemical compounds in a macromolecular gel-lattice matrix comprised of 30–50% water and that is fluid at temperature of 30–40° C. and sets to a rigid gel system upon cooling and drying. The compound-containing macromolecular gel-lattice matrix (vehicle) is encapsulated in a shell comprised of gelatin, glycerin, and water to yield a finished capsule having a water content of 5–20%. Capsules of this invention are highly stable and the high water percentage of the gel-lattice matrix does not destroy the shell by virtue of the moisture equilibrium that is formed between the shell and the macromolecular gel-lattice matrix.

FIELD OF THE INVENTION

This invention relates to soft gelatin capsules containing aqueous solutions and suspensions of chemicals or medicinals that, by virtue of their high water content, normally attack the gelatin shells causing their deterioration. This invention also relates to an improved method of encapsulating such aqueous systems. In particular, the invention relates to soft gelatin capsules, and to methods of their manufacture, which capsules contain as a fluid fill, a system comprising a chemical or medicinal aqueous solution or suspension and a macromolecular gel-lattice matrix, which system is highly stable and has a long lifetime. The resultant capsules contain medicinal or chemical compositions that are highly active by virtue of the fact that they are in aqueous suspension or solution as contrasted to prior art oleaginous or oily vehicle type preparations.

BACKGROUND OF THE INVENTION

Two distinct forms of gelatin capsules are well recognized in the art: hard and soft capsules. The hard gelatin capsule type is unplasticized, and is composed of two parts, a cap and a body which are fitted together after the body has been filled with an appropriate component. The soft type is a plasticized capsule of one piece, sealed construction enclosing the components therein. Although both types of capsules are made in various shapes and sizes, and both can enclose a wide variety of components, soft gelatin capsules are used generally for enclosing a fluid or semi-fluid fill, while hard shell, two piece capsules are normally used for powders, or time-delay beadlets.

A well-recognized and very serious difficulty in the art of encapsulating components of soft capsules is the inherent and marked affinity of the gelatin capsule shell for water. Special precautions are required to keep the water content in the components and in any accompanying vehicle at a critical minimum. Otherwise, the water exerts extremely deleterious effects on the gelatin thus reducing the yield of quality-controlled capsules and impairing their storage stability. Typical defects include leaking, indenting, and shrinking. No less serious are defects of excessively soft capsules or those having soft spots. If special precautions to exclude water from the shell and the components are not followed carefully, the soft capsules will break during the encapsulation process. Even if the capsules do survive this manufacturing process, storage after manufacture results in further softening of the capsules, the appearance of small holes at the point of any contact between water and the gelatin shell of the capsule, the gradual loss of an acceptable character of the capsules, termed "elegance," and even loss of the components therein.

The most commonly applied solution to these problems has been the use of a water immiscible oil as the vehicle for the pharmaceutical or chemical component being encapsulated. However, such oily vehicles suffer the disadvantage of not being readily dispersed, and the chemical or pharmaceutical components thereof do not go into solution rapidly in the aqueous environment of use due to retarding of dispersion or solution by the oil. For instance, after the oral ingestion of gelatin capsules for therapeutic purposes, encapsulated components must normally become dissolved in the aqueous media in the gastrointestinal tract before absorption can take place. The components in oily vehicles must be leached away from the oil by the aqueous medium before absorption can occur. In addition, the practical manufacture of soft gelatin capsules is greatly hampered by the fact that the components to be encapsulated may be entirely insoluble or only slightly soluble in the oily vehicle which is necessary to protect the outer gelatin shell. As a result, many of the chemical or pharmaceutical active ingredients are dispersed rather than carried in solution, and many must be encapsulated in larger capsules than would be necessary if a water-miscible vehicle having no adverse effects on the gelatin were available. In addition, some of the oily vehicles, particularly those carrying suspended components, do not provide uniform suspensions; that is, the amount of the active ingredient per unit of oily vehicle is not always constant or easily controllable due to the difficulties of producing uniform suspensions.

Common attempts to solve the above difficulties have not been particularly successful, and result in other drawbacks. These attempts at solutions include hardening of the outer shell by modification of the gelatin through use of formaldehyde, a so-called tanning process. Another solution has been to use extremely low amounts of water such as illustrated in U.S. Pat. No. 3,445,563 by drying the beads to a 2% moisture content. However, chemical hardening makes the outer shell difficulty ingestible, and drying does not provide for the use of aqueous solutions or suspensions of the active ingredients. British Patent No. 993,138 combines both these methods, disclosing "gel-coated" beadlets which are both inherently dry and tanned.

Another approach to the problem was proposed in U.S. Pat. No. 2,667,268 which employed, as water inhibitors, hydroxy aliphatic ethers of aliphatic polyols in a preferred proportion of at least 2:1 with reference to water present. The ethers included hydroxy ethylene, propylene and butylene ethers of the various glycols and polyglycols such as ethylene, propylene, butylene, polyethylene, polypropylene and polybutylene glycols as well as their hydroxy derivatives such as glycerins, polyglycerols, dioxyglycerine, and the higher polyols including tetritols, pentitols and hexitols. The inhibitors are prepared by reaction of the glycols with the alkylene oxides; the polyoxyalkylene chain lengths may vary from an average of 1 to 100 ether groups per mole of polyol with from 6–20 being preferred.

Another similar approach was proposed in U.S. Pat. No. 2,780,355 involving the dissolution or dispersion of the active ingredient in a water soluble hygroscopic organic liquid containing from 6–40 units of ethylene oxide per molecular. Particular materials taught included polyethylene glycols having a molecular weight of from 300–900, mono-fatty esters of polyethylene glycol such as polyethylene glycol monolaurate and polyethylene glycol monooleate and polyoxyethylene ethers of mixed partial fatty acid esters of sorbitol anhydrides, such as polyoxyethylene (20) sorbitan monooleate.

Still another approach was proposed in U.S. Pat. 2,990,334 involving the use of a dioxolane vehicle within which to disperse the active ingredient as a fill for a soft gelatin capsule. Dioxolane is itself formed from ethylene glycol and formaldehyde, and the disclosed vehicle permits a water content of 0 to about 10%, based on the volume of the entire vehicle. This low percentage of water is on the order of that attained by conventional techniques using polyethylene glycol suspensions of an active ingredient.

Something of a hybrid solution is proposed in British Patent No. 1,015,251 which describes a water-in-oil emulsion of a medicament-containing aqueous solution, which aqueous phase may amount to 37% of the emulsion. The continuous phase is a high viscosity, paraffin/paraffin oil solution which at −20° C. becomes physically rigid. However, at room temperature, the system is stable for only seven weeks, with a third of the aqueous, dispersed phase having migrated to the outer gelatin shell. To help reduce this migration the patent teaches that the inner wall of the capsule is treated with a hydrophobic substance such as silicone or aluminum stearate. Nevertheless, the capsule must be stored at low temperatures to maintain stability.

The aforesaid difficulties in the manufacture, storage, lifetime, effectiveness, and use of soft shelled capsules have caused a long-felt but unsolved need for a vehicle which contains the superior solubilizing and dispersing action of a water-containing vehicle for use with a wide variety of components to be encapsulated.

THE INVENTION

Objects

It is among the objects of this invention to overcome the aforesaid difficulties in the use of soft gelatin capsules, and to provide a stable soft gelatin capsule having a water-containing solution or suspension of an active ingredient in the fill.

It is another object of this invention to provide a method of encapsulating aqueous solutions and suspensions of chemical compounds and medicaments.

It is another object of this invention to provide an improved soft gelatin capsule containing a fluid or semi-fluid fill composed of a macro-molecular gel-lattice matrix as a carrier for an aqueous solution or suspension of a chemical compound or medicament.

It is another object of this invention to provide a soft gelatin capsule having a fill containing as high as a 15–20% water solution of an active ingredient, yet which has a long life and does not exhibit the problems of softening, deterioration, or attack by substances normally deleterious to the gelatin shell.

It is another object of this invention to provide an improved soft gelatin capsule which fill, by virtue of its composition, can provide a higher concentration of the active ingredient in a smaller capsule volume than heretofore available.

Still other and further objects of the invention are evident from the detailed description and specific examples which follow.

SUMMARY AND DETAILED DESCRIPTION OF THE INVENTION

We have discovered that a highly stable non-oleaginous containing fill can be prepared by forming a macromolecular gel-lattice matrix, hereinafter called a gel-lattice vehicle, which contains from 30–50% of an aqueous solution or suspension of a chemical, medicinal, or pharmaceutical compound. Generally speaking, the gel-lattice vehicle is fluid at a temperature of from 30–40° C., and is filled into soft gelatin capsules of conventional shell composition. Upon cooling and drying, the gel-lattice vehicle sets to a rigid gel system containing as much as 15–20% water.

By non-oleaginous, we mean that the vehicle for the solution or suspension of the active ingredient is not the oily or oleaginous type of material heretofore used. Although we prefer to use only water as the active solvent, we do not intend to exclude from the scope of our invention the use of small percentages of non-aqueous, water-miscible solvents for the chemical, medicinal, or pharmaceutical compounds employed as the active ingredient. For example, some chemical or pharmaceutical compounds are preferentially soluble in an aqueous system comprisnig water and a water-miscible component, such as an alcohol or glycol. These types of systems are also encompassed within the scope of our invention, but in all cases the final water content of the soft gelatin capsule is substantially above that heretofore used.

The concentration of the solution or dispersion of the active ingredient is determined by the size of the dose and the size of the capsule desired. Since the desired volume of the capsule is known, the concentration of the active substance is easily calculable therefrom. Although the ratio of the active ingredient to the solution vehicle may vary over a wide range, a preferred range is from 1:1 to 7:1 by weight. Since the active ingredients are more soluble in water, and the water-containing system of this invention, than they are in the conventional oily vehicles, greater concentrations of the active ingredient are possible. Thus, the capsules of this invention may be of smaller volume which is another decided advantage of the present invention.

The fill compositions of the present invention may be encapsulated in a shell of plasticized gelatin of conventional formulation having from about 30 to 53 parts of gelatin, 15 to 48 parts of a plasticizer such as glycerin, and from 16 to 40 parts of water. In addition, the gelatin shells also may contain as a preservative mixed parabens, ordinarily methyl and propyl parabens in about a 4:1 ratio. The parabens are incorporated in a minor portion by weight of the gelatin, glycerin and water. The gelatin is ordinarily of a bloom value on the order of 160 to 200, although this may be varied to suit the particular desired end use. The gelatin composition is prepared into a fluffy mass by mixing the ingredients thoroughly, and melting the agglomerates under a more or less complete vacuum to a smooth fluid mass. The capsules may be simultaneously formed and filled using a method and apparatus such as that disclosed in U.S. Pats. 1,970,396; 2,288,327 and 2,318,718 issued to R. P. Scherer.

The gelatin composition for the shell is first cast into endless ribbons about .025 to .070 inch thick on drums comprising part of the capsulating machine. A pair of such ribbons is advanced continuously along a converging path into juxtaposition betwen a pair of die rolls, each roll having a plurality of cooperating die cavities adapted to form a spherical shell from the gelatin ribbon about an accurately measured dosage of warm liquid fill (prepared in accordance with the invention as discussed in more detail below), which content is discharged into the space between the ribbon. The capsule may be spherical, cylindrical with rounded ends, ellipsoidal or any other appropriate, preferably rounded, shape. The pressure of the delivery of the fluid dosage deforms preselected areas of the ribbon into conformation with the cavities of the dies, and the dies apply the pressure required to seal the gelatin at the periphery of the capsule. In another type of filling operation, preselected areas of the ribbon are deformed into conformity with die cavities by means of vacuum on the die side of the ribbon and then filled. This capsulating operation is performed without trapping any air within the capsule and without wasting any of the fluid content.

In addition to formation from ribbons, the term "shell" covers other means of formation, for example by extrusion, casting and the like. By using concentric extrusion machines, as illustrated for instance in U.S. Pat. 3,032,950, an outer tube of an appropriate shell composition (disclosed in detail below) is extruded as a shell around an inner cylindrical core of macromolecular gel-lattice containing the active ingredient. The shell and core extrusion is then formed and cut into individual capsules of desired shape and size.

Immediately after formation, the capsules are relatively weak and are therefore strengthened, for example by exposure to dry, warm air, or to some other agent capable of extracting water from the capsule wall or shell. The macromolecular gel-lattice matrix containing the aqueous solution or suspension of this invention which is ordinarily fluid at the temperature of 30–40° C. during filling, sets to a rigid gel system upon cooling and/or drying. The system then dries to a point where the moisture in the gelatin shell is in equilibrium with the macromolecular gel-lattice fill matrix. At this point, the manufacturing process has been completed and capsules are considered to be in final or finished form.

The macromolecular compositions that may be used to form the macromolecular gel-lattice matrix for the aqueous solutions or suspensions comprise those macromolecular compounds which are water-soluble or form colloidal hydrates.

Hereafter, in both the specification and the claims, the term "water-soluble macromolecular compounds" should be construed to include those that form colloidal hydrates rather than true solutions. Among the water-soluble macromolecular compositions that may be used to form the gel-lattice matrices of this invention are polypeptides such as gelatin, casein, collagen, albumin, soya protein, and soy peptone; polysaccharides such as pectin, agar, acacia, karaya, tragacanth, Irish moss, algins and alginates, guar, Iceland moss, modified starches; and synthetics such as polyvinyl pyrrolidone, methyl cellulose, sodium cellulose sulfate, carboxymethyl cellulose, hydroxypropyl cellulose, polyacrylic acid, cross linked polyacrylic acid, ethylene maleic anhydride co-polymers and polyvinyl alcohol.

Gel-lattice matrices are prepared as follows: the powdered, flaked, or lump macromolecular polymer is added to water which may be heated and which may contain a plasticizer if required. The mixture is then agitated with low shear agitation to minimize any reduction in the molecular weight of the macromolecular polymers. The agitator speed is also such as to minimize the incorporation of air. Any air which is incorporated must be removed by vacuum deaeration or allowing air to rise at ambient pressures.

A plasticizer is incorporated in the formulation, to enhance flow properties or if the macromolecular matrix would be brittle or lack elasticity on drying. For instance, glycerin is employed in plasticizing gelatin, casein, pectin, alginates, methyl cellulose, sodium cellulose sulfate, polyvinyl alcohol and modified starches. Plasticizers such as diethyl phthalate, diethyl sebacate, triethyl citrate, may be employed to plasticize methyl cellulose, carboxymethyl cellulose, polyvinyl pyrrolidone and polyacrylic acid.

An alternative procedure is as follows: the polymer is weighed into a change-can type mixer. Any plasticizer required is added and the mixture is agitated gently until all particles are uniformly wetted. The agitation is continued and chilled water is added. The agitation or stirring is continued until the polymer ceases to absorb water. The high molecular weight polymer completely absorbs the added water, and a fluffy, soft and slightly agglomerated mass results. This mass is then deaerated and kept under vacuum while raising the mass to the desired temperature between about 30 to 40° C.

We prefer a high concentration of macromolecular gel-lattice matrix having as low a viscosity as possible in order to avoid problems during the filling and drying operations. However, the viscosity of the gel-lattice matrix at the preferred temperature range of 35° to 37° C. is critical only in the sense that it determines which type of encapsulation machine may be employed in forming the capsule. For example, for gel-lattice matrices having a Brookfield viscosity at 37° C. ranging from 6,200 cps. to 83,500 cps., we can employ various types of commercially available machines, such as rotary die machines employing conventional positive displacement metering pumps; plate type capsule machines; automatic plate type capsule machines, so called "Accogel" machines; and concentric extrusion type capsule machines, for example as shown in U.S. Pat. 3,032,950. For a viscosity from above 83,500 cps. to and including 254,400 cps., we employ "Moyno" metering pumps with the rotary die machines and with the others mentioned above. For viscosities above 254,400 cps. we can employ concentric extrusion capsule machines and the so-called "Accogel" machines referred to above.

In formulations in which we employ gelatin as the gel-lattice matrix, we use a low bloom (low molecular weight) gelatin, preferably ranging from 0 to 40 bloom in order to incorporate the largest amount of gelatin possible and thereby reduce the amount of water to be evaporated during drying to reach a stable equilibrium with the shell moisture. These low blooms are necessary if a positive displacement metering pump is to be employed during the encapsulation. Where the metering system and the machine permits the use of high viscosity vehicles, very high bloom gelatin may be used, for example 280 bloom gelatin. The same molecular weight criteria may apply to any of the other natural and synthetic macromolecules hereinbefore enumerated.

The type of products which can be adapted to our invention are extremely varied, including chemicals, medicinals, foods and pharmaceutical compounds. Typical chemicals which can be incorporated in the matrix as the active ingredient include synthetic detergents as used in bubble baths and aromatic compounds as employed in room fresheners. Typical food type chemicals which may be employed are gravy mixes, food flavors and bouillon extract. Pharmaceuticals may include water-soluble or water-insoluble drugs, multi-vitamins and multi-vitamin-mineral mixtures, antihistamines, decongestants, sleeping preparations, tranquilizers, laxatives, cough preparations, antacid preparations, smoking deterrents, anti-diabetic agents, sedatives, suppositories, stimulants, and water stable antibiotics.

The above principles of our invention are illustrated in more detail in reference to the following specific examples, which are meant to be illustrative of these principles rather than limitations of the invention. Matrix components are given in grams per capsule.

ILLUSTRATIVE EXAMPLES OF THE INVENTION

Examples Showing the Use of Synthetic Macromolecular Gel-Lattice Vehicles (1) Diphenhydramine—Antihistamine-Somnifactient
    a. Martix Components:
        Diphenhydramine: 0.0500 grams
        Polyvinyl Pyrrolidone: 0.1151 grams
        Citrus Pectin: 0.0230 grams
        Water: 0.1036 grams
    b. Matrix Preparation:
        Mix the polyvinyl pyrrolidone with the pectin and water, stir in the diphenhydramine.
    c. Shell Components:
        Gelatin (bloom 160–200): 46.9 parts
        Glycerin: 21.6 parts
        Water: 31.5 parts
        Methyl & Propyl Parabens (4:1 ratio): 0.2 parts
    d. Encapsulation:
        Fill Weight: 0.292 Gm.
        Fill Volume: 4.0 minims
        Die Size: G/3 Oval 'HH'

(2) Phenylephrine HCL—Decongestant
   a. Matrix Components:
      High Amylose cornstarch [1]: 0.100 grams
      Water: 0.100 grams
      Carboxymethyl Cellulose (7 LP): 0.005 grams
      Phenylephrine HCL: 0.010 grams
   b. Matrix Preparation:
      Mix the cornstarch (Amylon) and C.M.C. with water. Mix thoroughly and add the phenylephrine HCL.
   c. Shell Components:
      Gelatin (bloom 160–200): 46.9 parts
      Glycerin: 21.6 parts
      Water: 31.5 parts
      Methyl & Propyl Parabens (4:1 ratio) 0.2 parts
   d. Encapsulation:
      Fill Weight: 0.215 Gm.
      Fill Volume: 2.85 minims
      Die Size: Y/2 Oval 'D'

(3) Isoproterenol HCL—Bronchodilator
   a. Matrix Components:
      High Amylose cornstarch [2]: 0.100 grams
      Water: 0.100 grams
      Polyacrylic acid [3]: 0.050 grams
      Isoproterenol HCL: 0.010 grams
   b. Matrix Preparation:
      Mix the cornstarch (Amylomaize), water, and polyacrylic acid (Acrysol A–5) and add the isoproterenol HCL.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.260 Gm.
      Fill Volume: 3.61 minims
      Die Size: Y/3 Oval 'HH'

(4) Ephedrine Sulfate—Decongestant
   a. Matrix Components:
      Polyvinyl Alcohol [4]: 0.100 grams
      Water: 0.150 grams
      Glycerin: 0.025 grams
      Ephedrine Sulfate: 0.025 grams
   b. Matrix Preparation:
      Mix the water and glycerin, warm to 30–40° C. and add the ephedrine sulfate, then add the PVA and dissolve.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.300 Gm.
      Fill Volume: 6.0 minims
      Die Size: Y/5 Oblong 'A'

(5) Dimenhydrinate-Pyridoxine HCL—Antinauseant
   a. Matrix Components:
      Polyvinyl Alcohol [5]: 0.100 grams
      Water: 0.150 grams
      Glycerin: 0.050 grams
      Dimenhydrinate: 0.050 grams
      Pyridoxine HCL: 0.050 grams
   b. Matrix Preparation:
      Mix water, glycerin, dimenhydrinate, pyridoxine HCL and add Elvanol. Mill and deaerate the suspension.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.400 Gm.
      Fill Volume: 6.5 minims
      Die Size: Y/6 Oblong 'B'

(6) Chlorpromazine HCL—Major Tranquilizer
   a. Matrix Components:
      Ethylene Maleic Anhydride Co-polymer [6]: 0.150 grams
      Ammonium Hydroxide (50%): 0.100 grams
      Glycerin: 0.050 grams
      Chlorpromazine HCL: 0.010 grams
   b. Matrix Preparation:
      Add the EMA co-polymer to the ammonium hydroxide, add glycerin, and stir in the chlorpromazine hydrochloride.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.310 Gm.
      Fill Volume: 6.7 minims
      Die Size: Y/6 Oblong 'B'

(7) Chlorpheniramine Maleate—Antihistamine
   a. Matrix Components:
      Polyvinyl Pyrrolidone: 0.1260 grams
      Water: 0.0880 grams
      Glycerin: 0.0127 grams
      Chlorpheniramine Maleate: 0.0040 grams
   b. Matrix Preparation:
      Mix the PVP with water and glycerin and stir in the active ingredient.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.231 Gm.
      Fill Volume: 3.3 minims
      Die Size: G/2 Oval 'D'

(8) Isoniazid—Antituberculous Agent
   a. Matrix Components:
      Ethylene Maleic Anhydride co-polymer [7]: 0.150 grams
      Ammonium Hydroxide (50%): 0.120 grams
      Isoniazid: 0.150 grams
      Glycerin: 0.050 grams
   b. Matrix Preparation:
      Add ammonium hydroxide solution to ethylene maleic anhydride with mixing, add glycerin and isoniazid. Mix well, mill suspension and deaerate. Keep warm for proper gelling.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.470 Gm.
      Fill Volume: 5.0 minims
      Die Size: Y/4 Oblong 'B'

(9) Dimenhydrinate—Antinauseant

---

[1] Amylon modified starch used.
[2] Amylomaize modified starch.
[3] Acrysol A–5 polyacrylic acid.
[4] Du Pont Elvanol² 51–05 polyvinyl alcohol.
[5] Du Pont Elvanol² 51–03 polyvinyl alcohol.
[6] Monsanto ethylene maleic anhydride—11 co-polymer.
[7] Monsanto ethylene maleic anhydride—11 co-polymer.

a. Matrix Components:
   Sodium Cellulose Sulfate [8]: 0.100 grams
   Ethanol (25% $H_2O$): 0.250 grams
   Glycerin: 0.070 grams
   Dimenhydrinate: 0.050 grams
b. Matrix Preparation:
   Disperse dimenhydrinate in the gel system comprised of the aqueous ethanol, glycerin and sodium cellulose sulfate. Mill the suspension and deaerate.
c. Shell Components:
   Gelatin (bloom 160–200): 46.9 parts
   Glycerin: 21.6 parts
   Water: 31.5 parts
   Methyl & Propyl Parabens
      (4:1 ratio): 0.2 parts
d. Encapsulation:
   Fill Weight: 0.470 Gm.
   Fill Volume: 9.0 minims
   Die Size: Y/8 Oblong 'A'

Examples Showing the Use of Polypeptide Macromolecular Gel-Lattic Vehicles

(10) Phenolphthalein—Laxative
a. Matrix Components:
   Gelatin: 0.1000 grams
   Glycerin: 0.0280 grams
   Water: 0.1105 grams
   Phenolphthalein: 0.0972 grams
   Sodium Saccharin: 0.0020 grams
   Peppermint Oil USP
      (emulsified): 0.0003 grams
b. Matrix Preparation:
   To the phenolphthalein, saccharin and glycerin, add enough water to mix to a suspension that can be milled. Mix the gel with the remaining amount of water, and add the peppermint oil emulsion. Deaerate and keep the mix at 35° C.
c. Shell Components:
   Gelatin (bloom 160–200): 46.9 parts
   Glycerin: 21.6 parts
   Water: 31.5 parts
   Methyl & Propyl Parabens
      (4:1 ratio): 0.2 parts
d. Encapsulation:
   Fill Weight: 0.338 Gm.
   Fill Volume: 5.3 minims
   Die Size: Y/4 Oblong 'B'

(11) Dioctyl Sodium Sulfosuccinate—Stool Softener
a. Matrix Components:
   Gelatin: 0.335 grams
   Glycerin: 0.070 grams
   Water: 0.225 grams
   50% Dioctyl Sodium Sulfosuccinate
      (aqueous solution) [9]: 0.200 grams
b. Matrix Preparation:
   Add dioctyl sodium sulfosuccinate and glycerin to the warm water. Add the gelatin and mix, then deaerate.
c. Shell Components:
   Gelatin (bloom 160–200): 42.0 parts
   Sorbitol-Glycerin (1:1): 29.1 parts
   Water: 28.9 parts
   Methyl & Propyl Parabens
      (4:1 ratio): 0.2 parts
d. Encapsulation:
   Fill Weight: 0.850 Gm.
   Fill Volume: 11.8 minims
   Die Size: G/10 Oval 'EE'

(12) Bubble Bath
a. Matrix Components:
   Gelatin: 0.0711 grams
   Glycerin: 0.0467 grams
   Water: 0.0378 grams
   Foaming detergent [10]: 0.0444 grams
b. Matrix Preparation
   Add the gelatin and glycerin to water, mix in the detergent and deaerate.
c. Shell Components:
   Gelatin (bloom 160–200): 46.9 parts
   Glycerin: 21.6 parts
   Water: 31.5 parts
   Methyl & Propyl Parabens
      (4:1 ratio): 0.2 parts
d. Encapsulation:
   Fill Weight: 0.200 Gm.
   Fill Volume: 2.5 minims
   Die Size: G/2 Round 'A'

(13) Chewable Antacid
a. Matrix Components:
   Gelatin: 0.357 grams
   Glycerin: 0.389 grams
   Water: 0.859 grams
   Aluminum Hydroxide, Magnesium
      Carbonate Copreciptate: 0.467 grams
   Sugar Powder 6X: 0.093 grams
   Sodium Saccharin: 0.009 grams
   Peppermint Oil (Flavor
      Emulsion 25%): 0.035 grams
b. Matrix Preparation:
   To the hot water add the glycerin and gelatin. Add the powders, mix, mill the suspension, deaerate and add the flavor emulsion (peppermint).
c. Shell Components:
   Gelatin (bloom 160–200): 43.2 parts
   Glycerin: 28.5 parts
   Water: 28.3 parts
   Sodium Saccharin: 0.5 parts
   Flavor Emulsion: 1.0 parts
   Methyl & Propyl Parabens
      (4:1 ratio): 0.2 parts
d. Encapsulation:
   Fill Weight: 2.209 Gm.
   Fill Volume: 28.0 minims
   Die Size: W/28 Round 'A'

(14) Breath Freshener
a. Matrix Components:
   Gelatin: 0.0881 grams
   Glycerin: 0.0578 grams
   Water: 0.1287 grams
   Sodium Saccharin: 0.0016 grams
   Breath Freshener (Flavor
      emulsion): 0.0138 grams
b. Matrix Preparation:
   To the warm water add the glycerin, gelatin; the powders and mix. Mill the suspension, deaerate and add flavor emulsion.
c. Shell Components:
   Gelatin (bloom 150–160): 38.9 parts
   Glycerin: 25.6 parts
   Water: 29.8 parts
   Methyl & Propyl Parabens
      (4:1 ratio): 0.2 parts
   Sodium Saccharin: 0.5 parts
   Flavor Emulsion: 5.0 parts
d. Encapsulation:
   Fill Weight: 0.290 Gm.
   Fill Volume: 4.0 minims
   Die Size: Y/3 Oval 'HH'

(15) Chewable Cough—Antitussive

---

[8] Kelco Co., sodium cellulose sulfate.
[9] American Cyanamid "Complemix 50" dioctyl sodium sulfosuccinate.
[10] Miranol 2 MCA modified foaming detergent, being 2-cocoyl-2-imidazalinium lauryl-sulfate-1-carboxymethyl - oxyethyl-1-carboxyethyl-disodium salt.

a. Matrix Components:
 Gelatin: 0.3369 grams
 Glycerin: 0.2005 grams
 Water: 0.4451 grams
 D. Methorphan HBr 10% Adsorbate: 0.1500 grams
 Saccharin Sodium: 0.0120 grams
 Sugar Powder 6X: 0.0971 grams
 Lidocaine HCl: 0.0030 grams
 Flavor Emulsion:
  1-Menthol: 0.0024 grams
  Anethol: 0.0012 grams
  Gum Arabic: 0.0018 grams
b. Matrix Preparation:
 To the warm water add the glycerin, gelatin and the powders, mix and mill suspension, deaerate and add the flavor emulsion.
c. Shell Components:
 Gelatin (bloom 160-200): 45.0 parts
 Glycerin: 25.1 parts
 Water: 29.9 parts
 Flavor Emulsion: 1.0 parts
 Sodium Saccharin: 0.5 parts
 Methyl & Propyl Parabens (4:1 ratio): 0.2 parts
d. Encapsulation:
 Fill Weight: 1.250 Gm.
 Fill Volume: 16.1 minims
 Die Size: G/15 Round 'C'

(16) Lobeline Sulfate—Smoking Deterrent
a. Matrix Components:
 Gelatin: 0.0875 grams
 Glycerin: 0.0575 grams
 Water: 0.1277 grams
 Lobeline Sulfate: 0.0005 grams
 Sodium Saccharin: 0.0013 grams
 Flavor Emulsion:
  Anethol: 0.0010 grams
  Menthol: 0.0010 grams
  Gum Arabic: 0.0005 grams
b. Matrix Preparation:
 To the water add the lobeline, saccharin, glycerin and gelatin; mix, deaerate and add the flavor emulsion.
c. Shell Components:
 Gelatin (bloom 150-160): 43.4 parts
 Glycerin: 20.0 parts
 Water: 36.6 parts
 Flavor Emulsion: 1.0 parts
 Sodium Saccharin: 0.5 parts
 Methyl & Propyl Parabens (4:1 ratio): 0.2 parts
d. Encapsulation:
 Fill Weight: 0.277 Gm.
 Fill Volume: 3.8 minims
 Die Size: Y/3 Oblong 'A'

(17) Gelatin—Finger Nail Capsules
a. Matrix Components:
 Gelatin: 0.4066 grams
 Glycerin: 0.0783 grams
 Water: 0.3741 grams
 Vitamin D (400 M.U./Gm. emulsified): 0.0037 grams
b. Matrix Preparation:
 To the water add the glycerin and gelatin, then add Vitamin D emulsion.
c. Shell Components:
 Gelatin (bloom 160-200): 46.9 parts
 Glycerin: 21.6 parts
 Water: 31.5 parts
 Methyl & Propyl Parabens (4:1 ratio): 0.2 parts d. Encapsulation:
 Fill Weight: 0.860 Gm.
 Fill Volume: 10.8 minims
 Die Size: G/14 Oblong 'A'

(18) Chewable Antacid
a. Matrix Components:
 Gelatin: 0.3053 grams
 Glycerin: 0.3330 grams
 Water: 0.7350 grams
 Aluminum Hydroxide, Magnesium Carbonate Coprecipitate: 0.4000 grams
 Sugar Power 6X: 0.0800 grams
 Saccharin, Sodium: 0.0080 grams
 Peppermint Oil Flavor Emulsion: 0.0600 grams
b. Matrix Preparation:
 To the hot water add the glycerin, gelatin, then the antacid and sweeteners, mill the suspension, deaerate and add peppermint oil flavor emulsion.
c. Shell Components:
 Gelatin (bloom 160-200): 43.2 parts
 Glycerin: 28.5 parts
 Water: 28.3 parts
 Sodium Saccharin: 0.5 parts
 Flavor Emulsion: 1.0 parts
 Methyl & Propyl Parabens (4:1 ratio): 0.2 parts
d. Encapsulation:
 Fill Weight: 1.9213 Gm.
 Fill Volume: 25.0 minims
 Die Size: W/28 Round 'A'

(19) Breath Freshener
a. Matrix Components:
 Gelatin: 0.0881 grams
 Glycerin: 0.0578 grams
 Water: 0.1287 grams
 Sodium Saccharin: 0.0016 grams
 Breath Freshener (Flavor emulsion): 0.0138 grams
b. Matrix Preparation:
 To the warm water add the glycerin and gelatin then the powders, mix and mill the suspension, deaerate and add the flavor emulsion.
c. Shell Components:
 Gelatin (Bloom 150-160): 38.9 parts
 Glycerin: 25.6 parts
 Water: 29.8 parts
 Sodium Saccharin: 0.5 parts
 Flavor Emulsion: 5.0 parts
 Methyl & Propyl Parabens (4:1 ratio): 0.2 parts
d. Encapsulation:
 Fill Weight: 0.288 Gm.
 Fill Volume: 4.0 minims
 Die Size: Y/3 oblong 'A'

(20) Dimenhydrinate—Antinauseant
a. Matrix Components:
 Sodium Caseinate: 0.100 grams
 Glycerin: 0.050 grams
 Water: 0.200 grams
 Dimenhydrinate: 0.050 grams
b. Matrix Preparation:
 Mix water with glycerin and warm the solution. Add sodium caseinate in small portions, dissolving each portion completely. Intermittently and dimenhydrinate to reduce the viscosity of the mix. Maintain temperature until mix is uniform and deaerate.
c. Shell Components:
 Gelatin (bloom 160-200): 46.9 parts
 Glycerin: 21.6 parts
 Water: 31.5 parts
 Methyl & Jropyl Parabens (4:1 ratio): 0.2 parts d. Encapsulation:
  Fill Weight: 0.430 Gm.
  Fill Volume: 5.9 minims
  Die Size: G/5 Oval "HH"

(21) Phenylephrine HCl—Decongestant:
  a. Matrix Components:
    Microcrystalline Collagen[11]: 0.100 grams
    Water: 0.300 grams
    Glycerin: 0.100 grams
    Phenylephrine HCl: 0.010 grams
  b. Matrix Preparation:
    Add collagen and glycerin to water, mix and add phenylephrine hydrochloride.
  c. Shell Components:
    Gelatin (bloom 160–200): 46.9 parts
    Glycerin: 21.6 parts
    Water: 31.5 parts
    Methyl & Propyl Parabens (4:1 ratio): 0.2 parts
  d. Encapsulation:
    Fill Weight: 0.510 Gm.
    Fill Volume: 8.4 minims
    Die Size: Y/7.5 Oval 'E'

(22) Ephedrine Sulfate—Decongestant
  a. Matrix Components:
    Soya Albumin: 0.100 grams
    Water: 0.050 grams
    Glycerin: 0.020 grams
    Ephedrine Sulfate: 0.025 grams
  b. Matrix Preparation:
    Add soya albumin and glycerin to water, mix and add ephedrine sulfate.
  c. Shell Components:
    Gelatin (bloom 160–200): 46.9 parts
    Glycerin: 21.6 parts
    Water: 31.5 parts
    Methyl & Propyl Parabens (4:1 ratio): 0.2 parts
  d. Encapsulation:
    Fill Weight: 0.195 Gm.
    Fill Volume: 3.0 minims
    Die Size: Y/2 Round 'A'

(23) Chlorpromazine HCl—Major Tranquilizer
  a. Matrix Components:
    90% Soya Protein[12]: 0.100 grams
    Glycerin: 0.075 grams
    Water: 0.175 grams
    Chlorpromazine HCl: 0.010 grams
  b. Matrix Preparation:
    Add soya protein and glycerin to water, mix and add chlorpromazine HCl.
  c. Shell Components:
    Gelatin (bloom 160–200): 46.9 parts
    Glycerin: 21.6 parts
    Water: 31.5 parts
    Methyl & Propyl Parabens (4:1 ratio): 0.2 parts
  d. Encapsulation:
    Fill Weight: 0.360 Gm.
    Fill Volume: 3.7 minims
    Die Size: G/3 Oval 'HH'

(24) Flavor-Color—For use with Gelain Dessert Mix
  a. Matrix Components:
    Gelatin: 0.259 grams
    Glycerin: 0.100 grams
    Water: 0.222 grams
    Strawberry Flavor: 0.052 grams
    Strawberry Color: 0.016 grams
    Polysorbate 80: 0.011 grams
  b. Matrix Preparation:
    Mix polysorbate 80 in warm water, add flavor and color. Add glycerin and mix well. Dissolve gelatin in the above, keep warm and stir until dissolved.

[11] American Viscose Avitene H, microcrystalline collagen.
[12] A. E. Staley 90% soya protein.

c. Shell Components:
    Gelatin (bloom 160–200): 46.9 parts
    Glycerin: 21.6 parts
    Water: 31.5 parts
    Methyl & Propyl Parabens (4:1 ratio): 0.2 parts
  d. Encapsulation:
    Fill Weight: 0.660 Gm.
    Fill Volume: 9.0 minims
    Die Size: Y/9 Round 'B'

(25) Phenformin HCl—Hypoglycemic Agent, Antidiabetic
  a. Matrix Components:
    Soy Peptone: 0.100 grams
    Water: 0.030 grams
    Glycerin: 0.010 grams
    Phenformin HCl: 0.025 grams
  b. Matrix Preparation:
    Add soy peptone and glycerin to water at 50° C., mix and add phenformin HCl.
  c. Shell Components:
    Gelatin (bloom 160–200): 46.9 parts
    Glycerin: 21.6 parts
    Water: 31.5 parts
    Methyl & Propyl Parabens (4:1 ratio): 0.2 parts
  d. Encapsulation:
    Fill Weight: 0.165 Gm.
    Fill Volume: 3.0 minims
    Die Size: Y/2 Oblong 'A'

(26) Chlorpheniramine Maleate—Antihistamine
  a. Matrix Components:
    Gelatin: 0.150 grams
    Water: 0.050 grams
    Glycerin: 0.020 grams
    Chlorpheniramine Maleate: 0.004 grams
  b. Matrix Preparation:
    Add gelatin and glycerin to water, mix and add chlorpheniramine maleate.
  c. Shell Components:
    Gelatin (bloom 160–200): 46.9 parts
    Glycerin: 21.6 parts
    Water: 31.5 parts
    Methyl & Propyl Parabens (4:1 ratio): 0.2 parts
  d. Encapsulation:
    Fill Weight: 0.224 Gm.
    Fill Volume: 5.0 minims
    Die Size: Y/4 Oblong 'B'

(27) Sodium Amobarbital 200 mg. (Sedative, Hypnotic)
  a. Matrix Components:
    Gelatin: 221.2 mg./capsule
    Glycerin: 42.5 mg./capsule
    Water: 203.0 mg./capsule
    Sodium Amobarbital: 200.0 mg./capsule
  b. Matrix Preparation:
    Add glycerin to water, then add gelatin and finally dissolve sodium amobarbital.
  c. Shell Components:
    Gelatin (bloom 160–200): 46.9 parts
    Glycerin: 21.6 parts
    Water: 31.5 parts
    Methyl & Propyl Parabens (4:1 ratio): 0.2 parts
  d. Encapsulation:
    Die Size: W/8 Oblong C
    Fill Volume: 9.3 minims

(28) Chloral Hydrate 500 mg. (Sedative, Soporific)
  a. Matrix Components:
    Gelatin: 237.0 mg./capsule
    Glycerin: 217.5 mg./capsule
    Water: 45.5 mg./capsule
    Chloral Hydrate: 500.0 mg./capsule
  b. Matrix Preparation:
    Add glycerin to water, then add chloral hydrate and stir in gelatin until dissolved.

c. Shell Components:
   Gelatin (bloom 160–200): 46.9 parts
   Glycerin: 21.6 parts
   Water: 31.5 parts
   Methyl & Propyl Parabens (4:1 ratio): 0.2 parts
d. Encapsulation:
   Die Size: W/11 Oblong 'A'
   Fill Volume: 13.8 minims

(29) Dioctyl sodium Sulfosuccinate 100 mg. Stool Softener):
  a. Matrix Components:
     Gelatin: 94.8 mg./capsule
     Glycerin: 18.2 mg./capsule
     Water: 87.0 mg./capsule
     Dioctyl Sodium Sulfosuccinate: 100.0 mg./capsule
  b. Matrix Preparation:
     Add dioctyl sodium sulfosuccinate and glycerin to warm water. Add gelatin and mix, then de-aerate.
  c. Shell Components:
     Gelatin (bloom 160–200): 42.0 parts
     Sorbitol-Glycerin (1:1): 29.1 parts
     Water: 28.9 parts
     Methyl & Propyl Parabens (4:1 ratio): 0.2 parts
  d. Encapsulation:
     Die Size: W/3 Oval 'HH'
     Fill Volume: 4.2 minims

(30) Dienestrol Vaginal Suppository:
  a. Matrix Components:
     Gelatin: 812.21 mg./capsule
     Glycerin: 1187.07 mg./capsule
     Water: 603.95 mg./capsule
     Dienestrol: 0.77 mg./capsule
     Lactose, Hydrous, Impalpable: 189.00 mg./capsule
     Lactic Acid (85%): 0.60 mg./capsule
  b. Matrix Preparation:
     Mix glycerin, water and lactic acid, dissolve gel. Add lactose and dienestrol and stir until uniform.
  c. Shell Components:
     Gelatin (160–200 bloom): 35.0 parts
     Glycerin: 48.0 parts
     Water: 17.0 parts
     Methyl & Propyl Parabens (4:1 ratio): 0.2 parts
  d. Encapsulation:
     Die Size: G/40 Suppository 'A'
     Fill volume: 38.8 minims

(31) Chewable Breath Freshener:
  a. Matrix Components:
     Gelatin: 87.5 mg./capsule
     Glycerin: 57.5 mg./capsule
     Water: 125.7 mg./capsule
     Sodium Saccharin: 1.6 mg./capsule
     Flavor Emulsion: 15.7 mg./capsule
  b. Matrix Preparation:
     Mixing: To warm water add glycerin and gelatin. Add powders, mix and mill suspension. Deaerate. Add flavor emulsion.
  c. Shell Components:
     Gelatin (bloom 150–160): 38.9 parts
     Glycerin: 25.6 parts
     Water: 29.8 parts
     Methyl & Propyl Parabens (4:1 ratio) 0.2 parts
     Sodium Saccharin: 0.5 parts
     Flavor Emulsion: 5.0 parts
  d. Encapsulation:
     Die Size: Y/3 Oblong 'A'
     Fill Volume: 4.0 minims

(32) Nail Capsule (Help prevent nail-splitting):
  a. Matrix Components:
     Gelatin: 504.8 mg./capsule
     Water: 463.9 mg./capsule
     Glycerin: 96.9 mg./capsule
     Solubilized Vitamin D 400,000 D/Gm: emulsified: 0.4 mg./capsule
  b. Matrix Preparation:
     Mixing: To water add glycerin and gelatin, then add Vitamin D emulsion.
  c. Shell Components:
     Gelatin (bloom 160–200): 46.9 parts
     Glycerin: 21.6 parts
     Water: 31.5 parts
     Methyl & Propyl Parabens (4:1 ratio): 0.2 parts
  d. Encapsulation:
     Die Size: G/14 Oblong 'A'
     Fill Volume: 14.8 minims

(33) Chewable Cough
  a. Matrix Components:
     Gelatin: 250.0 mg./capsule
     Glycerin: 165.3 mg./capsule
     Water: 367.0 mg./capsule
     Menthol: 2.0 mg./capsule
     Anethole: 1.0 mg./capsule
     Gum Acacia: 1.5 mg./capsule
     D-Methorphan HBr 10% Adsorbate: 150 mg./capsule
     Sodium Saccharin: 10.0 mg./capsule
     Sucrose: 80.0 mg./capsule
     Benzocaine: 2.2 mg./capsule
  b. Matrix Preparation:
     Mixing: To warm water add glycerin and gelatin. Add powders, mix and mill suspension. Deaerate. Add flavor emulsion.
  c. Shell Components:
     Gelatin (bloom 160–200): 45.0 parts
     Glycerin: 25.1 parts
     Water: 29.9 parts
     Flavor Emulsion: 1.0 parts
     Sodium Saccharin: 0.5 parts
     Methyl & Propyl Parabens (4:1 ratio): 0.2 parts
     Benzocaine: 0.2 parts
  d. Encapsulation:
     Die Size: G/15 Round 'C'
     Fill Volume: 14.1 minims

(34) Gelatin Color and Flavor Capsule (Color and Flavor Gelatin Desserts)
  a. Matrix Components:
     Imitation Strawberry flavor N820L (F&F): 57.0 mg./capsule
     #7192 Strawberry Shade Color Blend with 2.5% Dioctyl Sodium Sulfosuccinate: 17.0 mg./capsule
     Gum Acacia: 28.5 mg./capsule
     Gelatin: 235.8 mg./capsule
     Water: 216.4 mg./capsule
     Glycerin: 45.3 mg./capsule
  b. Matrix Preparation:
     Add glycerin to portion of water, dissolve gelatin in glycerin-water solution, add color and flavor which has been emulsified with water and acacia.
  c. Shell Components:
     Gelatin (bloom 160–200): 46.9 parts
     Glycerin: 21.6 parts
     Water: 31.5 parts
     Methyl & Propyl Parabens (4:1 ratio): 0.2 parts
  d. Encapsulation:
     Die Size: Y/9 Round 'B'
     Fill Volume: 8.3 minims

(35) Chlorpromazine HCl 25 mg. (Major Tranquilizer)
  a. Matrix Components:
     Gelatin: 130.4 mg./capsule
     Glycerin: 25.0 mg./capsule
     Water: 119.6 mg./capsule
     Chlorpromazine HCl: 25.0 mg./capsule b. Matrix Preparation:
  Add glycerin to water, dissolve gelatin in the solution, add chlorpromazine HCl and stir until uniform.
c. Shell Components:
  Gelatin (bloom 160–200): 46.9 parts
  Glycerin: 21.6 parts
  Water: 31.5 parts
  Methyl & Propyl Parabens (4:1 ratio): 0.2 parts
d. Encapsulation:
  Die Size: Y/3 Oblong 'A'
  Fill Volume: 4.1 minims

(36) Caffeine Capsules (Stimulant)
a. Matrix Components:
  Gelatin: 192.6 mg./capsule
  Glycerin: 126.6 mg./capsule
  Water: 280.8 mg./capsule
  Caffeine: 200.0 mg./capsule
b. Matrix Preparation:
  To water add glycerin and then dissolve gelatin, add caffeine, stir until uniform and mill if necessary.
c. Shell Components:
  Gelatin (bloom 160–200): 46.9 parts
  Glycerin: 21.6 parts
  Water: 31.5 parts
  Methyl & Propyl Parabens (4:1 ratio): 0.2 parts
d. Encapsulation:
  Die Size: G/9.5 Oblong 'A'
  Fill Volume: 11.1 minims

(37) Sodium Amobarbital 60 mg. (Hypnotic)
a. Matrix Components:
  Gelatin: 66.4 mg./capsule
  Glycerin: 12.7 mg./capsule
  Water: 60.9 mg./capsule
  Sodium Amobarbital: 60.0 mg./capsule
b. Matrix Preparation:
  Add glycerin to water, gelatin and finally dissolve sodium amobarbital.
c. Shell Components:
  Gelatin (bloom 160–200): 46.9 parts
  Glycerin: 21.6 parts
  Water: 31.5 parts
  Methyl & Propyl Parabens (4:1 ratio): 0.2 parts
d. Encapsulation:
  Die Size: G/2 Oval 'D'
  Fill Volume: 2.8 minims

(38) Ferrous Sulfate Capsules (Hematinic)
a. Matrix Components:
  Gelatin: 85.3 mg./capsule
  Glycerin: 16.4 mg./capsule
  Water: 78.3 mg./capsule
  Ferrous Sulfate: 20.0 mg./capsule
b. Matrix Preparation:
  Dissolve ferrous sulfate in water and add glycerin, then gelatin and stir until uniform.
c. Shell Components:
  Gelatin (bloom 160–200): 46.9 parts
  Glycerin: 21.6 parts
  Water: 31.5 parts
  Methyl & Propyl Parabens (4:1 ratio): 0.2 parts
d. Encapsulation:
  Die Size: W/2 Oval 'D'
  Fill Volume: 2.8 minims

(39) Diphenhydramine HCl Capsules (Antihistamine)
a. Matrix Components:
  Gelatin: 94.8 mg./capsule
  Glycerin: 81.2 mg./capsule
  Water: 87.0 mg./capsule
  Diphenhydramine HCl: 50.0 mg./capsule
b. Matrix Preparation:
  Stir glycerin into water. Add gelatin, stir until dissolved. Add diphenhydramine HCl.
c. Shell Components:
  Gelatin (bloom 160–200): 46.9 parts
  Glycerin: 21.6 parts
  Water: 31.5 parts
  Methyl & Propyl Parabens (4:1 ratio): 0.2 parts
d. Encapsulation: G/3 Oblong 'A'
  Fill Volume: 3.47 minims

(40) Phenolphthalein Chewable Laxative
a. Matrix Components:
  Gelatin: 138.7 mg./capsule
  Glycerin: 26.6 mg./capsule
  Water: 127.2 mg./capsule
  Sodium Saccharin: 2.0 mg./capsule
  Flavor Emulsion: 19.0 mg./capsule
  Phenolphthalein: 97.5 mg./capsule
b. Matrix Preparation:
  Add enough water to phenolphthalein, saccharin and glycerin so that suspension can be milled, then add solution of gel in the remaining amount of water, add the flavor emulsion deaerate and keep mix at 35°–40° C.
c. Shell Components:
  Gelatin (bloom 160–200): 46.9 parts
  Glycerin: 21.6 parts
  Water: 31.5 parts
  Methyl & Propyl Parabens (4:1 ratio): 0.2 parts
d. Encapsulation:
  Die Size: W/5 Oblong 'A'
  Fill Volume: 5.7 minims

(41) Lobeline Sulfate (Chewable Smoking Deterrent)
a. Matrix Components:
  Gelatin: 87.5 mg./capsule
  Glycerin: 57.5 mg./capsule
  Water: 127.7 mg./capsule
  Sodium Saccharin: 1.3 mg./capsule
  Anethole: 1.0 mg./capsule
  Flavor Emulsion Menthol: 1.0 mg./capsule
  Gum Acacia: 0.5 mg./capsule
  Lobeline Sulfate: 0.5 mg./capsule
b. Matrix Preparation:
  Dissolve lobeline, saccharin, glycerin and gelatin in water, deaerate and add flavor emulsion.
c. Shell Components:
  Gelatin (bloom 150–160): 43.4 parts
  Glycerin: 20.0 parts
  Water: 36.6 parts
  Flavor Emulsion: 1.0 parts
  Sodium Saccharin: 0.5 parts
  Methyl & Propyl Parabens (4:1 ratio): 0.2 parts
d. Encapsulation:
  Die Size: Y/3 Oblong A
  Fill Volume: 3.8 minims

(42) Antacid Capsules (Chewable)
a. Matrix Components:
  Gelatin: 305.3 mg./capsule
  Glycerin: 333.0 mg./capsule
  Water: 735.0 mg./capsule
  Aluminum Hydroxide-Magnesium Carbonate Co-Precipitate: 400.0 mg./capsule
  Sugar Powder 6X: 80.0 mg./capsule
  Sodium Saccharin: 8.0 mg./capsule
  Flavor Emulsion: 60.0 mg./capsule
b. Matrix Preparation:
  To hot water add glycerin and gelatin, antacid and sweeteners, mill suspension, deaerate and add flavor emulsion.
c. Shell Components:
  Gelatin (bloom 160–200): 43.2 parts
  Glycerin: 28.5 parts
  Water: 28.3 parts
  Sodium Saccharin: 0.5 parts
  Flavor Emulsion: 1.0 parts
  Methyl & Propyl Parabens (4:1 ratio): 0.2 parts d. Encapsulation:
   Die Size: W/28 Round 'A'
   Fill Volume: 25.0 minims Examples Showing the Use of Polysaccharide Macromolecular Gel-Lattice Vehicles

(43) Breath Freshener
   a. Matrix Components:
      Citrus Pectin: 0.100 grams
      Water: 0.250 grams
      Glycerin: 0.100 grams
      Flavor Emulsion: 0.043 grams
      Sodium Saccharin: 0.005 grams
   b. Matrix Preparation:
      Add pectin and glycerin to water; mix and add saccharin.
      Then stir in flavor emulsion.
   c. Shell Components:
      Gelatin (bloom 150–160): 38.9 parts
      Glycerin: 25.6 parts
      Water: 29.8 parts
      Sodium Saccharin: 0.5 parts
      Flavor Emulsion: 5.0 parts
      Methyl & Propyl Parabens (4:1 ratio): 0.2 parts
   d. Encapsulation:
      Fill Weight: 0.748 Gm.
      Fill Volume: 1.0 minims
      Die Size: R/1 Round 'B'

(44) Diphenhydramine—Antihistamine, Somnifacient
   a. Matrix Components:
      Diphenhydramine: 0.0500 grams
      Polyvinyl Pyrrolidone: 0.1151 grams
      Citrus Pectin: 0.0230 grams
      Water: 0.1036 grams
   b. Matrix Preparation:
      Add polyvinyl pyrrolidone and pectin to cold water. Stir in the diphenyldramine and heat to 35°–40° C.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.292 Gm.
      Fill Volume: 4.0 minims
      Die Size: G/3 Oval 'HH'

(45) Chlorpheniramine Maleate—Antihistamine
   a. Matrix Components:
      Agar: 0.100 grams
      Water: 0.150 grams
      Glycerin: 0.050 grams
      Chlorpheniramine Maleate: 0.004 grams
   b. Matrix Preparation:
      Mix agar with water. Stir in chlorpheniramine maleate.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.304 Gm.
      Fill Volume: 5.1 minims
      Die Size: Y/4 Oblong 'B'

(46) Ferrous Sulfate—Hematinic
   a. Matrix Components:
      Ferrous Sulfate Exsiccated: 0.325 (96 mg. Fe) grams
      Acacia: 0.100 grams
      Water: 0.270 grams
      Glycerin: 0.030 grams
   b. Matrix Preparation:
      Mix $FeSO_4$ and acacia well, add water and glycerin. Stir over a hot plate 35°–40° C. Mill if necessary and deaerate. Store until needed at 55°–60° C., unless storage causes caking, in which case store below that temperature.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.725 Gm.
      Fill Volume: 7.3 minims
      Die Size: G/6 Oblong 'B'

(47) Ephedrine Sulfate—Decongestant
   a. Matrix Components:
      Ephedrine Sulfate: 0.025 grams
      Tragacanth: 0.100 grams
      Water: 0.225 grams
      Glycerin: 0.100 grams
   b. Matrix Preparation:
      Add ephedrine and glycerin to water. Add tragacanth, mix well and keep overnight with occasional stirring.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.625 Gm.
      Fill Volume: 5.2 minims
      Die Size: Y/4 Oblong 'B'

(48) Dimenhydrinate and Pyridoxine HCl—Antinauseant
   a. Matrix Components:
      Chondrus (Irish Moss): 0.100 grams
      Water: 0.200 grams
      Glycerin: 0.050 grams
      Dimenhydrinate: 0.050 grams
      Pyridoxine HCl: 0.050 grams
   b. Matrix Preparation:
      Add glycerin to water. Add Irish moss and drugs. Stir until uniform. Mill suspension and deaerate.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.45 Gm.
      Fill Volume: 6.0 minims
      Die Size: Y/5 Oblong 'A'

(49) Chlorpheniramine Maleate—Antihistamine
   a. Matrix Components:
      Citrus Pectin: 0.050 grams
      Water: 0.200 grams
      Sucrose Powder 6X: 0.646 grams
      Chlorpheniramine Maleate: 0.004 grams
   b. Matrix Preparation:
      Mix pectin and sucrose and add water with mixing, then add the chlorpheniramine maleate and mix.
   c. Shell Components:
      Gelatin (bloom 160–200): 46.9 parts
      Glycerin: 21.6 parts
      Water: 31.5 parts
      Methyl & Propyl Parabens (4:1 ratio): 0.2 parts
   d. Encapsulation:
      Fill Weight: 0.900 Gm.
      Fill Volume: 12.0 minims
      Die Size: Y/11 Oblong 'A'

(50) Apple Pectin with Soluble Vitamin E Capsules
   a. Matrix Components:
      Apple Pectin: 285.3 mg./capsule
      Glycerin: 54.8 mg./capsule
      Water: 261.9 mg./capsule
      d-Alpha Tocopheryl Polyethylene Glycol 1000 Succinate: 258.0 mg./capsule b. Matrix Preparation:
   Mix pectin with glycerin, add to water solution of d-alpha tocopherylpolyethylene glycol succinate.
c. Shell Components:
   Gelatin (bloom 160–200): 46.9 parts
   Glycerin: 21.6 parts
   Water: 31.5 parts
   Methyl & Propyl Parabens (4:1 ratio): 0.2 parts
d. Encapsulation:
   Die Size: W/9.5 Oblong 'A'
   Fill Volume: 11.9 minims As can be seen from the above, water-soluble macromolecular compositions in general may be used with water suspensions or solutions of active compounds. Water suspensions of active material which are either insoluble in the water or have limited solubilities therein are especially illustrated by Examples 5, 8–10, 15, 18, 20 and 48.

Although the mechanism is not entirely understood, and we do not wish to be bound by theory, it appears that the macromolecular gel-lattice matrix reaches a moisture equilibrium with the gelatin shell. Quite unexpectedly, with the system according to this invention, we have found that the soft gelatin capsules are defect-free after substantial periods of time on the order of 6–7 months, and from their condition at that time, have a projected life of 3–4 years, based on our experience. *Since* the finished capsules are substantially solid, they are not susceptible to leaking, craking, puncture, fracture, and distortion as are oil-vehicle soft gelatin capsules. The long life stability of such soft capsules is quite unexpected in view of the extremely high affinity of gelatin for water, and water-containing compositions heretofore used. In addition, the capsules of the present invention provide for rapid action of the active ingredient by virtue of the high water content of the capsules and absence of an inhibitory oil vehicle, even those which are old, by virtue of the fact that the water content is in equilibrium and is a relatively high value of from 5–20%.

It should be evident from the foregoing description and specific examples that many variations can be made within the scope of our invention without departing from the spirit thereof, and the scope of our invention is to be limited solely by the following claims.

We claim:
1. A filled one piece soft leak-tight gelatin capsule consisting essentially of a shell formed from a formulation comprising gelatin, initially 16–40 parts by weight of water, based on the total weight of said formulation, and plasticizer, and a solid fill contained within said shell, said fill consisting essentially of:
   a set rigid gel system of gelatin, casein, collagen, albumin, soya protein, or soya peptone in the form of a water-soluble macromolecular gel lattice matrix which contains from at least 5% to as much as 20% by weight of water, and an active medicinal ingredient in aqueous solution, suspension or dispersion, the ratio of said active ingredient to said matrix being from 1:1 to 7:1 by weight,
the water in said fill being in moisture equilibrium with the water in said shell and having substantially no deteriorating effect upon said shell.

2. The capsule as in Claim 1 wherein said gel lattice matrix is gelatin.

3. A capsule as in Claim 2 wherein said macromolecular gel-lattice matrix gelatin is low bloom gelatin, and the gelatin of said shell is high bloom gelatin.

4. A capsule as in Claim 2 wherein said low bloom gelatin has a bloom value from 0–40.

5. A capsule as in Claim 2 wherein said rigid gelatin matrix prior to drying and cooling and during capsule forming was fluid at 30–40° C. and contained 30–50% water.

References Cited

UNITED STATES PATENTS

| | | | |
|---|---|---|---|
| 2,580,683 | 1/1952 | Kreuger | 99—165 |
| 2,072,302 | 3/1937 | Herrmann et al. | 128—335.5 |
| 3,126,321 | 3/1964 | Kurtz | 206—84 X |
| 3,239,420 | 3/1966 | Gonshery et al. | 206—84 X |
| 3,376,199 | 4/1968 | Coles et al. | 206—84 X |
| 3,032,950 | 5/1962 | Oddo et al. | 53—140 |
| 3,632,350 | 1/1972 | Battista | 99—1 |
| 3,691,281 | 9/1972 | Battista | 424—195 |
| 3,520,971 | 7/1970 | Benford | 424—37 |
| 2,531,536 | 11/1950 | Silver | 99—140 |
| 1,925,765 | 9/1933 | Lindner | 99—140 |
| 2,358,598 | 9/1944 | Scherer | 99—124 |
| 2,555,467 | 6/1951 | Bogin | 99—123 |
| 3,620,759 | 11/1971 | Maddox | 99—78 |

FOREIGN PATENTS 721,944  3/1969  Belgium.

SHEP K. ROSE, Primary Examiner

U.S. Cl. X.R.

206—84